(No Model.) 3 Sheets—Sheet 1.
H. A. W. WOOD.
MECHANICAL MOVEMENT.
No. 570,587. Patented Nov. 3, 1896.
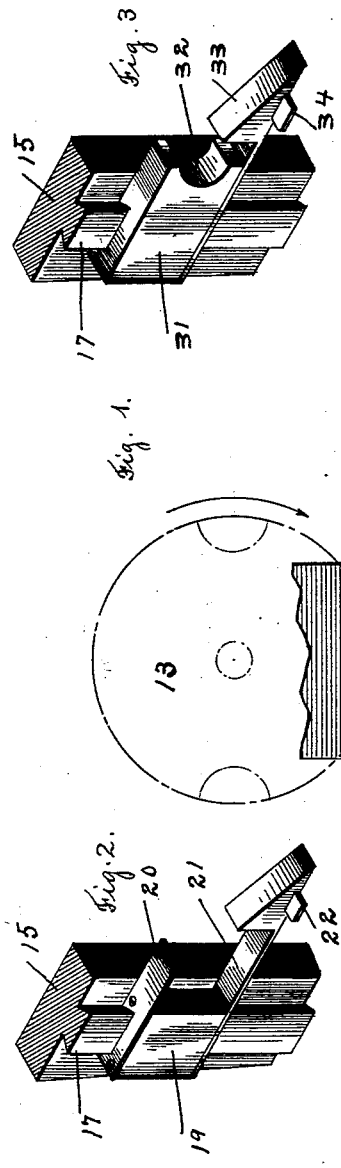
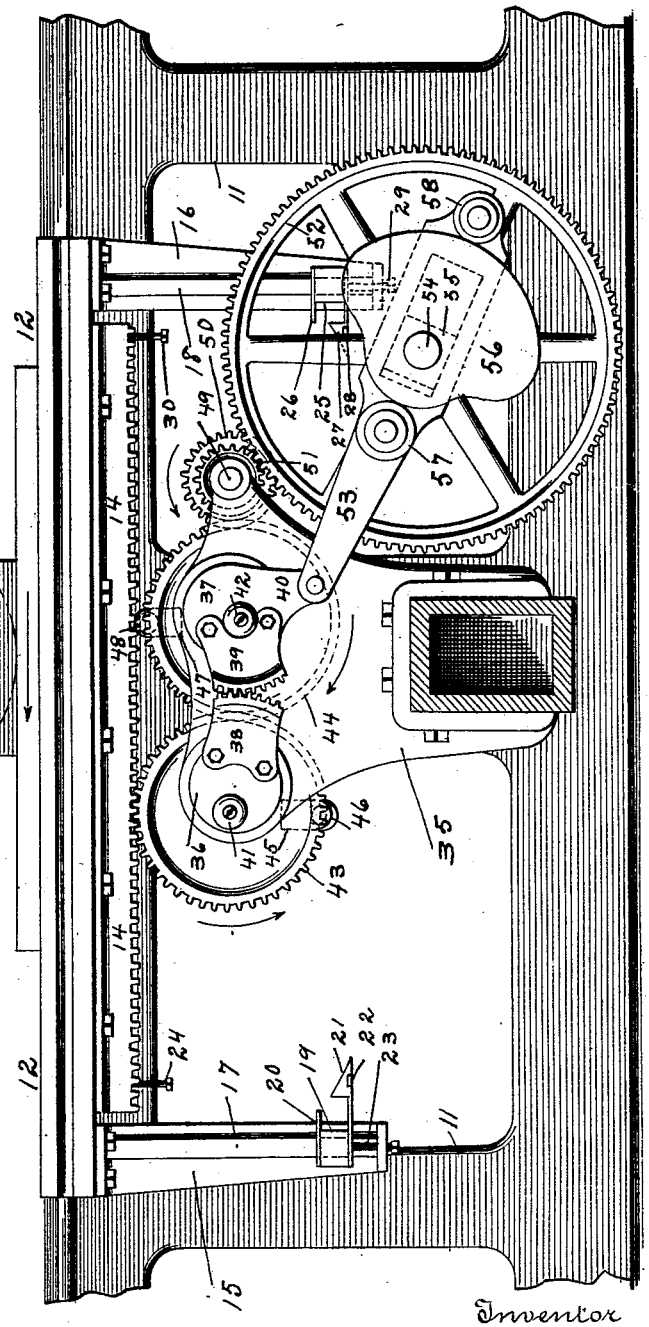
Witnesses
Chas. F. Schmelz
E. M. Healy
Inventor
H. A. W. Wood.
By his Attorney
Louis W. Southgate (No Model.) 3 Sheets—Sheet 2.

H. A. W. WOOD.
MECHANICAL MOVEMENT.

No. 570,587. Patented Nov. 3, 1896.

Witnesses
Chas. F. Schmelz
E. M. Healy

Inventor
H. A. W. Wood,
By his Attorney
Louis W. Southgate (No Model.)　　　　　H. A. W. WOOD.　　　　3 Sheets—Sheet 3.
MECHANICAL MOVEMENT.

No. 570,587.　　　　　　　　Patented Nov. 3, 1896.

Witnesses　　　　　　　　　Inventor
Chas. F. Schwef　　　　　　　H. A. W. Wood,
E. M. Healy　　　　　　　　By his Attorney
　　　　　　　　　　　　　Louis W. Southgate

UNITED STATES PATENT OFFICE.

HENRY A. WISE WOOD, OF NEW YORK, N. Y., ASSIGNOR TO THE CAMPBELL PRINTING PRESS AND MANUFACTURING COMPANY, OF SAME PLACE.

MECHANICAL MOVEMENT.

SPECIFICATION forming part of Letters Patent No. 570,587, dated November 3, 1896.

Application filed October 19, 1892. Serial No. 449,394. (No model.)

*To all whom it may concern:*

Be it known that I, HENRY A. WISE WOOD, a citizen of the United States, residing at New York, in the county of New York and State of New York, have invented a new and useful Improvement in Mechanical Movements, of which the following is a specification.

The aim of this invention is to produce a new and improved mechanical movement consisting of a means for converting rotary motion into rectilinearly-reciprocating motion; and to this end the invention consists of the device described and claimed in this specification, and illustrated in the accompanying three sheets of drawings, in which—

Figure 16:

Figure 1 is a sectional elevation of a printing-press with my improvement applied thereto. Fig. 2 is a detail of one of the parts I term "latch-blocks." Fig. 3 illustrates a modified form of the latch-block. Figs. 4 to 9, inclusive, are diagrams illustrating the operation of my device. Figs. 10 to 15, inclusive, are diagrams illustrating the operation of a slightly-different form of my device; and Fig. 16 is a detail illustrating the way the crank-arms are set in this modification.

My invention, strictly speaking, relates to a mechanical movement for converting rotary motion into rectilinearly-reciprocating motion; but my invention has been especially devised for use in connection with the reciprocating beds of printing-presses, although the same may be applied and used in any desired connection, such as, for example, to reciprocate heavy pump-pistons or planer-tables, without departing from the scope of my invention.

I will further describe my invention as applied and used in connection with a printing-press. A printing-press bed to secure the best results must be run at an even speed during the forward and return strokes and must be stopped and started again in the reverse direction without jar or vibration.

There are many mechanisms in use and well known, whereby a printing-press is driven on its forward and backward stroke; but with most of these the bed is reversed with considerable jar.

My invention consists in the combination, with any of the old forms of driving mechanisms, (which I will hereinafter term the "main driving mechanism,") of a peculiar mechanism which is adapted to reverse the movement of the bed independent of the main mechanism, and this mechanism I will hereinafter term the "reversing" mechanism. This reversing mechanism consists of two crank elements which are adapted to press against a part fixed to the bed to retard and stop the bed as it completes its movement in one direction and to start and accelerate the same in the reverse direction, and also of latch-blocks which are adapted to properly hold the crank elements in operative connection with the bed. A crank element is admirably adapted for the purpose of reversing the bed, as the same will take the bed at the full speed at which it is moved by the main driving mechanism and gradually retard and bring the bed to a state of rest, and then will gradually accelerate and start the same again in the reverse direction and deliver the bed back to the main driving mechanism without jar or shock.

Referring now to the drawings, and in detail, 12 represents the reciprocating bed or member, which may be mounted in the usual frames in any of the manners common in printing-presses, and adapted to coact with the bed 12 is the impression-cylinder 13.

I have shown the simplest form of a two-revolution cylinder printing-press, it being understood, of course, that my improvement may be applied and used to actuate the bed of any form of printing-press.

Attached to the under side of the bed is a rack 14, and depending from the bed are the brackets 15 and 16, on which are formed the guideways 17 and 18. Sliding on the guideway 17 is a latch-block 19, which carries a latch 21, which has an offset 22 and which also has a projection or piece 20, which is adapted to hold the crank-pin so that the vertical movement of the crank-pin will raise the latch-block. The offset 22 is adapted to strike against the adjustable bolt 24, and thus to open the latch to release the crank-pin, as hereinafter described. A similar latch-block 25 is mounted on the guide 18, and this latch-block has a similar latch 27 with an offset 28 and a retaining-piece 26, and this latch 27 is adapted to be opened by the adjustable bolt 30 as the latch-block is moved. It will be seen that the inside faces of the brackets 15 and 16 are formed on a vertical line, and the same are planed or finished off smooth, so that the crank-pin can move up and down in contact with these faces of the brackets.

So far as part of my invention is concerned, as hereinafter described, namely, of using two independent crank elements to reverse the bed in either direction, a bearing-block 31, having a recess 32 and a latch 33 with an offset 34 could be used, as shown in Fig. 3, and this bearing-block is specifically claimed and described in a companion application of mine, filed October 19, 1892, Serial No. 449,392, the difference between the bearing-block and the latch-block being that in the case of the latch-block the crank element bears against the bracket or a fixed part of the bed and that in the case of the bearing-block the crank-pin does not bear directly on the bracket, but into the sliding block itself.

The latch-blocks 19 and 25 are normally sustained in their lowest position and may be accurately adjusted in this position by means of the bolts 23 and 29, as shown.

Suitably mounted in the framing of the press is a bracket 35, and in this bracket 35 are journaled the two eccentric bushings 36 and 37, and on the sides of these eccentric bushings are fastened the intermeshing segments 38 and 39, and the eccentric bushing 37 has a projection 40. Journaled in the eccentric bushing 36 is a shaft 41, and journaled in the eccentric bushing 37 is a shaft 42, and mounted on these shafts are the intermeshing pinions or gears 43 and 44, and these pinions are adapted to alternately engage the rack 14 to positively drive the bed in opposite directions, and these gears and rack constitute, as will be seen, the main driving mechanism. Fastened on the face of the pinion 43 is a bracket 45, which carries a crank-pin 46, and fastened on the face of the gear 44 is a bracket 47, which carries a crank-pin 48.

Although for simplicity's sake in designing I have shown the crank elements as arranged on the side of the driving-pinions, it is evident, of course, that these crank elements could be separate arms and that they could be rotated by gearing directly from the main gearing, or that they could be mounted on extensions of the shafts 41 and 42. A shaft 49 may be also journaled in the bracket 35, and, if desired, this shaft 49 may constitute the means by which power is applied to operate the machine. On this shaft 49 is mounted a pinion 50, which meshes with and drives the pinion 44; and also mounted on this shaft 49 is a pinion 51, which meshes with and drives gear 52.

The arm 40 of the eccentric bushing 37 has connected to the same a yoke 53, which is mounted on a block 55, which block 55 is arranged on the shaft 54 of the gear 52, and also mounted on this shaft 54 is a cam 56, and the yoke 53 has rollers 57 and 58, which bear on the faces of the cam, as shown, and this cam is so arranged and proportioned and the gearing which drives the same is so proportioned that the pinions 43 and 44 will be alternately raised and lowered, as hereinafter described.

In the device under discussion the pinions 43 and 44 are made the same size, and the crank-pins 46 and 48 are oppositely disposed on said pinions, as shown.

Figure 4:
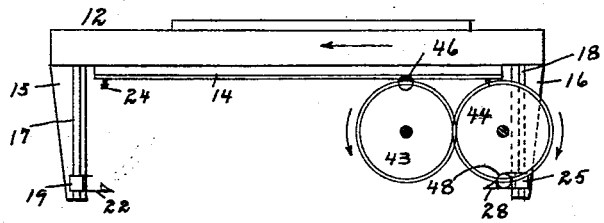
Figure 5:
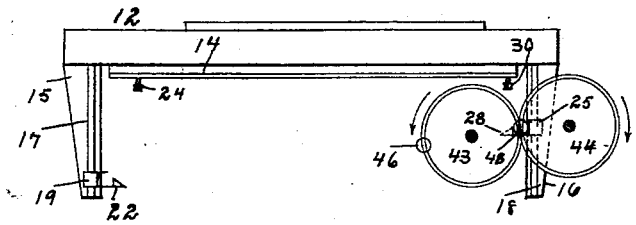
Figure 6:
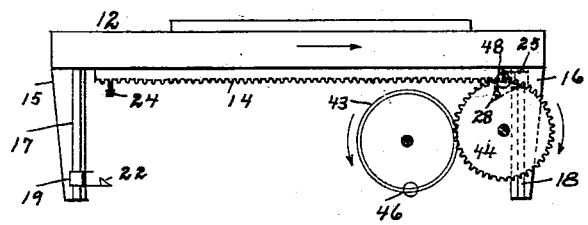
Figure 7:
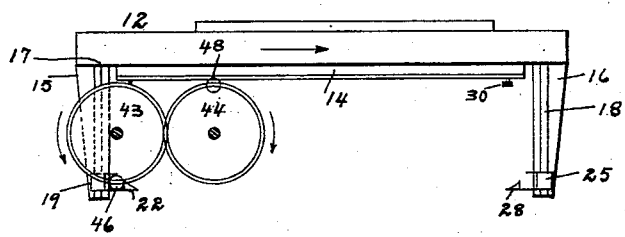
Figure 8:
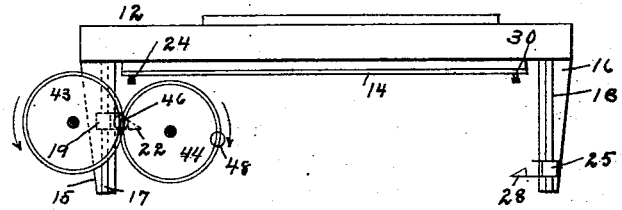
Figure 9:
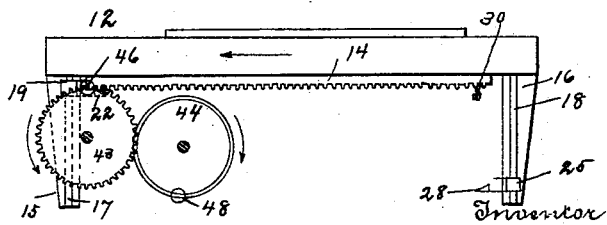

The operation of the device so far described is as follows, and reference should now be had to Sheet 2: In Fig. 1 the bed is shown as moving to the left, and the gear 43 as in mesh with the rack 14, and the gear 44 as out of mesh with the rack. Now, when the bed reaches the extreme of its movement to the left, by which it is moved by the main driving mechanism or the pinion 43, the bracket 16 will be brought against the crank-pin 48, and the latch 28 will keep the crank-pin 48 in engagement with the bracket. Just as this happens the gear 43 will be lowered and the gear 47 raised, or the parts will assume the position shown in Fig. 4. Now during the next quarter-revolution of the gears the bed can move still farther to the left a distance equal to the radius at which the crank-pins are set, which is a pitch radius of the pinions. This movement will gradually retard the bed and bring the same to a state of rest, as shown in Fig. 5. Now during the next quarter-revolution of the pinions the bed will be started on its movement to the right and will be gradually accelerated by the crank-pin 48 bearing or pushing on the bracket 16, and the parts will be brought to the position shown in Fig. 6, when the latch 28, by reason of its vertical movement, will be depressed to release the crank-pin 48. The bar or projection 20 or 26 on the latch-blocks is useful in that it tends to hold the latch-block to the crank-pins, so that the crank-pins will raise the latch-blocks. This last quarter-revolution of the pinions will bring the parts, as before stated, to the position shown in Fig. 6, when the pinion 47 will engage with the rack 14 and the bed will start on its main reciprocation to the right. As shown, the parts are designed so that the bed will be moved to the right a pitch circumference of the pinions, or the pinions will make one complete revolution for the main reciprocation in either direction. This will bring the parts to the position shown in Fig. 7, when the bracket 15 will be brought against the crank-pin 46 of the pinion 43, and the latch 22 will snap onto said crank-pin, and also as this takes place the gear 47 will be moved out of mesh with the rack 14. Now during the next quarter-revolution of the pinions the bed will move still farther to the right a pitch radius and will be brought to a state of rest by being gradually retarded by said crank-pin at its right-hand extreme, as shown in Fig. 8. Now during the next quarter-revolution of the pinions the bed will be gradually started and accelerated and will be moved a pitch radius to the left, when the crank-pin 46 will be released from the latch-block and the gear 43 will properly engage and mesh with the rack 14. Thus it will be seen that the entire movement of the bed in either direction is a circumference of the pinions plus two pitch radii, or a pitch circumference of the pinions plus a pitch diameter; or, again, it will be seen that the pinions make three complete revolutions for each complete forward and backward stroke of the bed.

By increasing the length of the rack 14 and of the bed it is obvious, of course, that the pinions could make five, seven, or any further odd number of revolutions for each reciprocation of the bed.

So far as the idea of bringing the crank element directly against a fixed part or bracket depending from the bed is concerned a single-crank element could be used, as shown in my companion application before referred to, and so far as the idea of the double crank is concerned instead of the latch-blocks bearing-blocks, as shown in Fig. 3, could be used.

It will be seen that the latch-blocks are raised by the crank-pins and that when they release the crank-pins the blocks will fall to their lowest or normal position. It is evident, of course, that the normal position of the blocks could be made the highest position, as shown in my companion application, and the crank-pins arranged so as to properly engage the same without departing from the scope of this invention.

Figure 10:
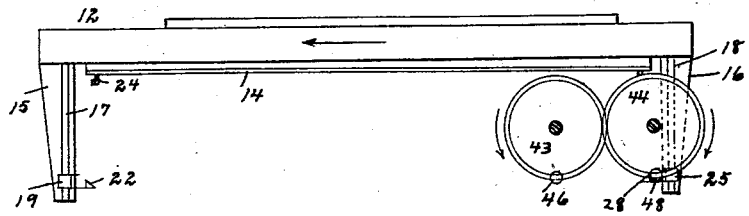
Figure 11:
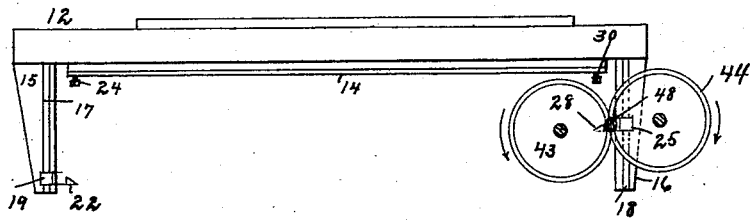
Figure 12:
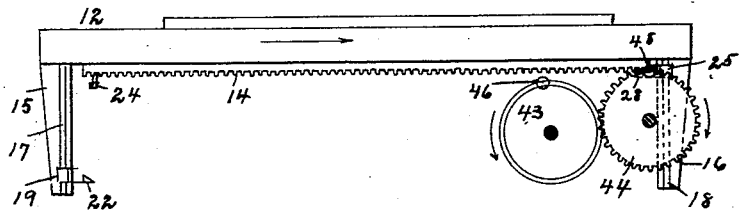
Figure 13:
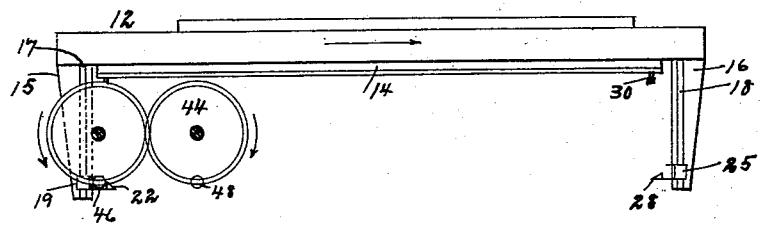
Figure 14:
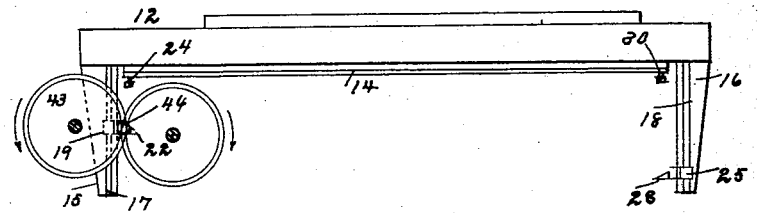
Figure 15:
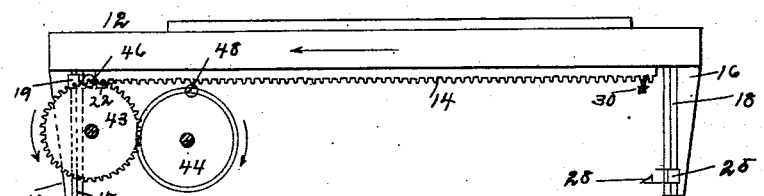

In some cases it may be desired to have the pinions make an even number of revolutions, and in this case all that is necessary is to properly lengthen the rack, as shown in Sheet 3, and to place the crank-pins on the same side or in the same relation on the intermeshing pinions as shown in said Sheet 3. In this sheet the main reciprocation of the bed is one and a half circumferences of the pinions, or one and a half circumferences plus any number of circumferences. Thus, as shown in Fig. 10, the bed is just finishing its main movement to the left. In Fig. 11 the same has been gradually retarded and brought to a state of rest by crank-pin 48. In Fig. 12 the bed has been gradually accelerated and started on its movement to the right by the crank-pin 48, this reversing taking a half-revolution of the pinions, as in the previous device. Now during the next revolution and a half of the pinions the bed will be moved on its main reciprocation to the right, or the parts will be brought to assume the position shown in Fig. 13, when the crank-pin 46 will engage the bracket 15 and the movement of the bed will be gradually decreased and the bed brought to a state of rest, as shown in Fig. 14, and then gradually accelerated and started on its movement to the left, or the parts brought to the position shown in Fig. 15, and this reversal takes a half-revolution of the pinions. Now during the next revolution and a half of the pinions the parts will be brought back to the position shown in Fig. 10. Thus in the device shown on Sheet 3 the main reciprocation in either direction takes one and a half turns of the pinions and each reversal takes one-half turn, or the pinions make four complete turns for each complete reciprocation of the bed. It is evident that by lengthening the bed one or more pitch circumferences this movement could be increased, so that the pinions would make six, eight, or any further even number of revolutions for each reciprocation of the bed. The movement of the bed in the particular device described in either direction is one and a half circumferences plus two pitch radii or a pitch diameter. In this last modification it is necessary to arrange the crank-pins 46 and 48 on gears 43 and 46 so that they will clear each other, and this can be nicely done by using a bracket 450 for the crank-pin 46, which will carry the crank-pin 46 out beyond the crank-pin 48, but still so that the crank-pin 46 will be set on the pitch circle of the gear 43, and by properly placing the brackets 15 and 16 on the bed, so as to properly coöperate with this arrangement of crank-pins.

The latch-blocks are not absolutely necessary, as it will be seen that the inertia of the bed is retarded by the movement of the crank-pin in one direction, whereby the bed will push on the crank-pin through one of the brackets during the gradual retardation of the bed, and that the bed is started again in the opposite direction by the crank-pin pushing on the bracket. Thus in the normal operation of the machine very little, if any, strain comes on the latches, but it is preferred generally to use the latches, so that the crank-pin will be kept nicely in engagement with the brackets, and if the bed should tend to move or get away from the crank-pin that the latch will hold the crank-pin firmly to the bracket, and so that if the machine should happen to be stopped while the same is on its reversing movement the machine could be started again without deranging the mechanism. Thus it will be seen that my invention consists in the combination of the moving member with any desired mechanism to give the same its main reciprocation, and a peculiar reversing mechanism; and the details and arrangement of this reversing mechanism and gearing herein shown and described may be greatly varied by a skilled mechanic without departing from the scope of my invention as expressed in the claims.

Having thus fully described my invention, what I claim, and desire to secure by Letters Patent, is—

1. The combination of the reciprocating bed or member with mechanism for reciprocating the same, and a reversing mechanism comprising a crank element, a depending bracket or part carried by the bed against which the crank element is adapted to bear, a latch mounted thereon vertically movable, independently of, and adapted to engage said crank element, and to keep the same against said bracket during the reversing movement, substantially as described.

2. The combination of the reciprocating bed or member with a rack-and-pinion mechanism adapted to reciprocate the same, and a reversing mechanism comprising a crank element, a depending bracket or part carried by the bed, against which the crank element is adapted to bear, a latch mounted thereon vertically movable, independently of, and adapted to engage said crank element, and to keep the same against said bracket during the reversing movement, substantially as described.

3. The combination of the reciprocating bed or member with a rack-and-pinion mechanism for reciprocating the same, and a reversing mechanism comprising a crank element, a depending bracket or part carried by the bed against which the crank element is adapted to bear, and a latch mounted thereon vertically movable, independently of, and adapted to engage said crank element, to keep the same against said bracket, when the rack-and-pinion mechanism is becoming inoperative as the driver, substantially as described.

4. The combination of the reciprocating bed or member with mechanism for reciprocating the same, and a reversing mechanism consisting of a crank element, a depending bracket or part carried by the bed, against which the crank element is adapted to bear, and a latch mounted thereon vertically movable, independently of, and adapted to engage said crank element, to keep the same against the said bracket during the reversing movement, and a projection against which the latch is adapted to strike as the same is vertically moved by the crank element, whereby said latch will release said crank element, substantially as described.

5. The combination of the reciprocating bed or member with mechanism for reciprocating the same, and a reversing mechanism consisting of a crank element, a depending bracket or part carried by the bed, against which the crank element is adapted to bear, and a vertically-movable latch adapted to engage said crank element, to keep the same against the said bracket during the reversing movement, said latch being normally held in one position, and adapted to return to its normal position when the same is released from the crank element, substantially as described.

6. The combination of the reciprocating bed or member with mechanism for reciprocating the same, and a reversing mechanism consisting of a crank element, a depending bracket or part carried by the bed, against which the crank element is adapted to bear, and a vertically-movable latch adapted to engage said crank element to keep the same against the said bracket during the reversing movement, the lowest position of said latch being its normal position, whereby said latch will fall to its normal position when disengaged from said crank element, substantially as described.

7. The combination of the reciprocating bed or member with mechanism for reciprocating the same, and a reversing mechanism consisting of a crank element, a depending bracket or part carried by the bed, against which the crank element is adapted to bear, a vertically-movable latch adapted to engage said crank element, to keep the same against said bracket during the reversing movement, said latch being adapted to normally remain in one position, and adapted to return to this position when disengaged from said crank element, and means for setting or adjusting the normal position of said latch, whereby the crank element can accurately engage with the same, substantially as described.

8. The combination of the reciprocating bed or member with mechanism for reciprocating the same, and a reversing mechanism comprising two crank elements, and a vertically-movable block carried at each end of the bed with which said crank elements are adapted to coöperate to reverse the bed in either direction, substantially as described.

9. The combination of the reciprocating bed or member with mechanism for reciprocating the same, and a reversing mechanism consisting of two crank elements, depending brackets or parts carried by the bed, against which the crank elements are adapted to bear, and a latch mounted on each of said brackets, adapted to keep one of said crank elements against the proper bracket during the reversing movement, substantially as described.

10. The combination of the reciprocating bed or member with a rack-and-pinion mechanism adapted to reciprocate the same, and a reversing mechanism consisting of two crank elements, a depending bracket or part carried at each end of the bed, and a vertically-movable latch carried by each of said brackets adapted to engage the proper crank element, during the reversing movement, substantially as described.

11. The combination of the reciprocating bed or member with a rack-and-pinion mechanism adapted to reciprocate the same, and a reversing mechanism consisting of two crank elements, a depending bracket or part carried at each end of the bed, against which, one of the crank elements is adapted to bear, and vertically-movable latches carried by said brackets, adapted to keep said crank elements against said brackets during the reversing movement of the bed, said latches being adapted to engage the crank elements, when the rack-and-pinion mechanism is becoming inoperative as the driver, substantially as described.

12. The combination of the reciprocating bed or member a rack carried by the same, two intermeshing pinions, means for alternately raising and lowering said pinions so that they will alternately engage said rack, and a reversing mechanism comprising two crank elements, and a vertically-movable block carried at each end of the bed, with which said crank elements are adapted to coöperate, to reverse the bed in either direction, substantially as described.

13. The combination of the reciprocating bed or member, a rack mounted on the same, two intermeshed pinions, means for alternately raising and lowering said pinions so that they will alternately engage with said rack, and a reversing mechanism consisting of two crank elements, depending brackets carried by the bed, and vertically-movable latches mounted on said brackets, substantially as described.

14. The combination of the reciprocating bed or member, with mechanism for reciprocating the same, and a reversing mechanism consisting of two crank elements, depending brackets or parts carried at each end of the bed, vertically-movable latches mounted on said brackets, adapted to hold the crank elements in proper engagement with the brackets, and projections adapted to strike said latches as the same are vertically moved by the crank element, and to release the same from the crank element, substantially as described.

15. The combination of the reciprocating bed or member with mechanism for reciprocating the same, and a reversing mechanism consisting of two crank elements, depending brackets or parts carried at each end of the bed, and a vertically-movable latch mounted on each of said brackets, adapted to engage the proper crank element, the normal position of both of said latches being at the lowest extremes, whereby, when they are released from the crank element, they will drop, or return to their normal positions, substantially as described.

16. The combination of the reciprocating bed or member, with mechanism for reciprocating the same, and a reversing mechanism comprising two crank elements, depending brackets or parts carried at each end of the bed, vertically-movable latches carried by said brackets, and means for adjusting the normal position of said latches, whereby the crank elements can accurately engage with the same, substantially as described.

17. In a reversing mechanism, substantially as described, the combination with the crank element, of the latch mechanism consisting of the vertically-movable block 19, having a latch as 21, and a part or projection as 20 adapted to hold the crank element in place, so that the crank element will vertically raise the latch mechanism, substantially as described.

18. The combination of the reciprocating bed or member, with mechanism for reciprocating the same, and a reversing mechanism comprising two crank elements each revolving continuously in one direction, and means whereby one of said crank elements will engage said bed to reverse its movement in one direction and whereby the other of said crank elements will engage said bed to reverse its movement in the opposite direction, substantially as described.

19. The combination of the reciprocating bed or member with mechanism for reciprocating the same, and a reversing mechanism consisting of two crank elements geared together so as to revolve oppositely, and means whereby one of said crank elements will engage said bed to reverse its movement in one direction and whereby the other of said crank elements will engage said bed to reverse its movement in the opposite direction, substantially as described.

20. The combination of the reciprocating bed or member, a rack carried by the same, two oppositely-revolving pinions, means whereby said pinions will be caused to alternately engage said rack, and a reversing mechanism comprising two revolving crank elements and means whereby one of said elements will engage the bed to reverse the same in one direction and the other crank element will engage the bed to reverse the same in the opposite direction, substantially as described.

21. The combination of the reciprocating bed or member, a rack carried by the same, two intermeshed pinions, means for alternately raising and lowering the same to engage said rack and a reversing mechanism comprising two crank elements and means whereby one of said elements will engage the bed to reverse the same in one direction and the other crank element will engage the bed to reverse the same in the opposite direction, substantially as described.

In testimony whereof I have hereunto set my hand in the presence of two subscribing witnesses.

H. A. WISE WOOD.

Witnesses:
JOHN J. MURRAY,
PHILIP STRAUB, Jr.